US012313233B2

(12) United States Patent
Luo

(10) Patent No.: US 12,313,233 B2
(45) Date of Patent: May 27, 2025

(54) ROD ASSEMBLY FOR AN UMBRELLA

(71) Applicant: Phaeton Manufacturing LLC, Jiangsu (CN)

(72) Inventor: Xiong Luo, Nantong (CN)

(73) Assignee: Phaeton Manufacturing LLC, Nantong (CN)

( * ) Notice: Subject to any disclaimer, the term of this patent is extended or adjusted under 35 U.S.C. 154(b) by 0 days.

(21) Appl. No.: 18/618,473

(22) Filed: Mar. 27, 2024

(65) Prior Publication Data

US 2024/0369200 A1 Nov. 7, 2024

(30) Foreign Application Priority Data

May 4, 2023 (CN) ........................ 202310494628.0

(51) Int. Cl.

*F21S 4/00* (2016.01)
*A45B 25/02* (2006.01)
*F21S 4/20* (2016.01)
*F21V 31/00* (2006.01)
*F21V 33/00* (2006.01)
*A45B 23/00* (2006.01)

(52) U.S. Cl.

CPC ................ *F21S 4/20* (2016.01); *A45B 25/02* (2013.01); *F21V 31/005* (2013.01); *F21V 33/0004* (2013.01); *A45B 23/00* (2013.01); *A45B 2023/0012* (2013.01); *A45B 2200/1018* (2013.01)

(58) Field of Classification Search

CPC ........................................................ F21S 4/20
See application file for complete search history.

(56) References Cited

U.S. PATENT DOCUMENTS

| | | | | |
|---|---|---|---|---|
| 7,000,624 | B2 * | 2/2006 | Chang | A45B 3/04 362/555 |
| 7,766,502 | B2 * | 8/2010 | Tress | F21V 33/0012 362/125 |
| 11,098,861 | B1 * | 8/2021 | Wang | A45B 23/00 |
| 2005/0067003 | A1 * | 3/2005 | Tsai | A45B 3/04 135/15.1 |
| 2021/0361042 | A1 * | 11/2021 | Mullet | A45B 25/006 |
| 2024/0041170 | A1 * | 2/2024 | Ke | A45B 25/02 |
| 2024/0085013 | A1 * | 3/2024 | Luo | F21V 23/06 |

* cited by examiner

*Primary Examiner* — Gerald J Sufleta, II
(74) *Attorney, Agent, or Firm* — Wang Law Firm, Inc.

(57) ABSTRACT

A rod assembly for an umbrella comprises a rod and a lampshade assembly, the lampshade assembly comprises a lampshade and a light strip; the rod is a hollow tube with a recess extending lengthwise along the rod on the bottom surface of the rod for receiving and positioning the lampshade, the lampshade is a hollow tube and the light strip is arranged inside the lampshade. The rod and the lampshade are respectively an integral part formed integrally or a one-piece part formed by bending and welding a plate. The present invention is reasonable in design, easy and quick to disassemble and assemble, and greatly convenient for daily maintenance. Furthermore, since the lampshade assembly is arranged below the bottom surface of the rod, the overall stability of the rod assembly will not be affected, the lighting range becomes wider, and the lighting effect is better.

6 Claims, 9 Drawing Sheets

ROD ASSEMBLY FOR AN UMBRELLA

TECHNICAL FIELD OF THE INVENTION

The present invention relates to a field of an umbrella, and in particular to a rod assembly for an umbrella.

BACKGROUND OF THE INVENTION

As a kind of outdoor leisure items, umbrellas are widely applied in squares, beaches, parks, gardens or similar places to shield an individual from sun. In order to make umbrellas used outdoor have a lighting function, umbrellas equipped with light strips have emerged at present, bringing comfort and convenience to outdoor activities at night in places such as beaches, open-air bars and coffee houses.

However, the light strips are mostly integrated with rods in the current market, are difficult to maintain once damaged, and are too large in packaging volume, resulting in an increase of transportation cost.

In addition, the conventional rods with light strips are generally made of profiles which have light grooves for receiving and fixing light strips and light covers. However, since the profiles are generally thin-walled, the rods are not strong enough. Moreover, the burrs on an edge of an opening of each light groove is easy to hard hands, and a joint between the light cover and the opening of the light groove is easy to leak, resulting in potential safety hazards. For example, a novel LED lamp disclosed in a Chinese Patent CN209711821U (patent No.: CN201822044177.8), a novel umbrella with a lamp disclosed in a Chinese patent CN214759555U (patent No.: CN202120753855.7) and the like have similar problems.

Upon searching, a Chinese Patent CN218588395U (patent No.: CN202222391410.6) disclosed a light mechanism for an umbrella, which comprises a column, a plurality of rods, a nest and a battery module. The rods are divided into long rods and short rods; a tail end of each long rod connects to the light rod assembly; each of the light rod assembly comprises a light rod and a light strip, and the light strip is arranged in the light rod; and, each long rod is detachably connected to the corresponding light rod assembly through a rod connector so as to realize the electrical connection between the light strip and the power supply end of each long rod. The light rod assembly with a light strip connects to the corresponding long rod by insertion, a female electrical connector is arranged on each light rod, and a male electrical connector is arranged on each long rod. When in use, the light rod assembly is inserted into the tail end of each long rod to complete assembly, and the male connector is electrically connected to the corresponding female connector, so that the light strip can be lighted for illumination. The light strip is mounted in each light rod, and the light rod is detachably connected to the corresponding the rod. However, since the light rod is connected to an outer end of the rod and the light rod serves as an extension rod of the rod, this connection mechanism between the light rod and the rod will inevitably reduce the firmness of the umbrella frame, and the light rod is easy to damage. Moreover, since the light strip is only mounted on the outer section of the umbrella frame, the lighting range is small.

SUMMARY OF THE INVENTION

It is an object of the present invention to provide a rod assembly for an umbrella, which is simple in design, convenient to assemble or disassemble and maintain and good in strength.

For achieving the above object, the rod assembly for an umbrella comprises a rod having a front end, a rear end and a bottom surface; and a lampshade assembly; wherein, the lampshade assembly comprises a lampshade having a front end, a rear end, a top and a bottom and a light strip having a left side, a right side, a front end and a rear end; the rod is a hollow tube with a recess extending lengthwise along the rod on the bottom surface of the rod for receiving and positioning the lampshade, the lampshade is a hollow tube and the light strip is arranged inside the lampshade.

Preferably, the rod and the lampshade are respectively an integral part formed integrally or a one-piece part formed by bending and welding a plate.

Preferably, the recess is formed by integrally inwardly extruding the rod which is a hollow metal tube, or formed by bending the rod which is a metal plate; a longitudinal section of the recess is of a dovetail shape, the recess has an opening at the bottom surface of the rod, a width of the opening is less than a maximum width of the whole recess; a width of the top of the lampshade is wider than that of the bottom of the lampshade matching with the recess in size; the light strip is arranged inside the lampshade extending lengthwise along the lampshade, the light strip has a wire and a connector both connected to the front end of the light strip.

Preferably, the lampshade has two concave surfaces respectively formed at a left side and a right side of the lampshade, a supporting edge is formed at an inner wall of each concave surface, a first positioning chamber is defined between the top of the lampshade and two supporting edges for receiving and positioning the light strip.

Preferably, the top of the lampshade is sealed, and the lampshade has a protruded portion at a middle portion of the top of the lampshade, the protruded portion with elasticity resists against a top surface of the recess.

Preferably, the lampshade has an opening with two sides at the top of the lampshade, the lampshade has an inwardly-bended buckle with a flat top at the top of the lampshade corresponding to a first side of the opening, and the lampshade has an inwardly-bended arc-shaped edge at the top of the lampshade corresponding to a second side of the opening, a second positioning chamber is defined between the top of the lampshade and two supporting edges for receiving and positioning the light strip; during mounting, the second side of the light strip is firstly clamped into the arc-shaped edge and the first side of the light strip is then clamped and positioned in the second positioning chamber by elasticity of the light strip, easy for mounting.

Preferably, the lampshade matches the light strip in length, the lampshade has a front lampshade tube plug at the front end of the lampshade, and a rear lampshade tube plug at the rear end of the lampshade, a positioning boss is arranged on the rear lampshade plug, the light strip has a corresponding positioning hole at the rear end of the light strip, the positioning boss is inserted into the positioning hole so that the rear end of the light strip is sleeved on the positioning boss, and, the front lampshade tube plug has a slot for allowing the wire at the front end of the light strip to pass through.

Preferably, the rod matches the lampshade in length, the rod has a front tube plug at the front end of the rod and a rear tube plug at the rear end of the rod, and, the front tube plug has a through hole corresponding to the slot on the front lampshade tube plug.

Preferably, the light strip has a magnet on a back side of the light strip, and the rod is made of a magnetic adsorbing material, the lampshade assembly is inserted into the recess of the rod and fixed by magnetic adsorption between the light strip and the rod.

Compared with the prior art, the present invention has the following advantages. The rod has a recess extending lengthwise along the rod on the bottom surface of the rod for receiving and positioning the lampshade, and the recess is formed by integrally inwardly extruding the rod which is a hollow metal tube, or formed by bending the rod which is a metal plate, thus the bottom surface of the rod corresponding to a surface of the recess is a double-layer wall but not a thin layer, so that the strength of the rod is greatly improved. A longitudinal section of the recess is of a dovetail shape, so the lampshade will not fall off when mounted inside the recess. The lampshade has two concave surfaces respectively formed at a left side and a right side of the lampshade, so that the lampshade is positioned in a first positioning chamber. The shape of the lampshade can be diversified, for example, the top of the lampshade can be sealed or opened, so that it is convenient to make the lampshade be mounted below the bottom surface of the rod. Moreover, since the lampshade is a hollow tube, the sealing performance is greatly improved, and an edge of the opening of the recess is prevented from leakage. Even if the lampshade is a hollow tube with an opening, since the opening is formed at the top of the lampshade, external water vapor can still be effectively prevented from leaking along the edge of the opening of the cavity. The present invention is reasonable in design, easy and quick to disassemble and assemble, and greatly convenient for daily maintenance. Furthermore, since the lampshade assembly is arranged below the bottom surface of the rod, the overall stability of the rod assembly will not be affected, the lighting range becomes wider, and the lighting effect is better.

DETAILED DESCRIPTION OF THE INVENTION

Figure 1:
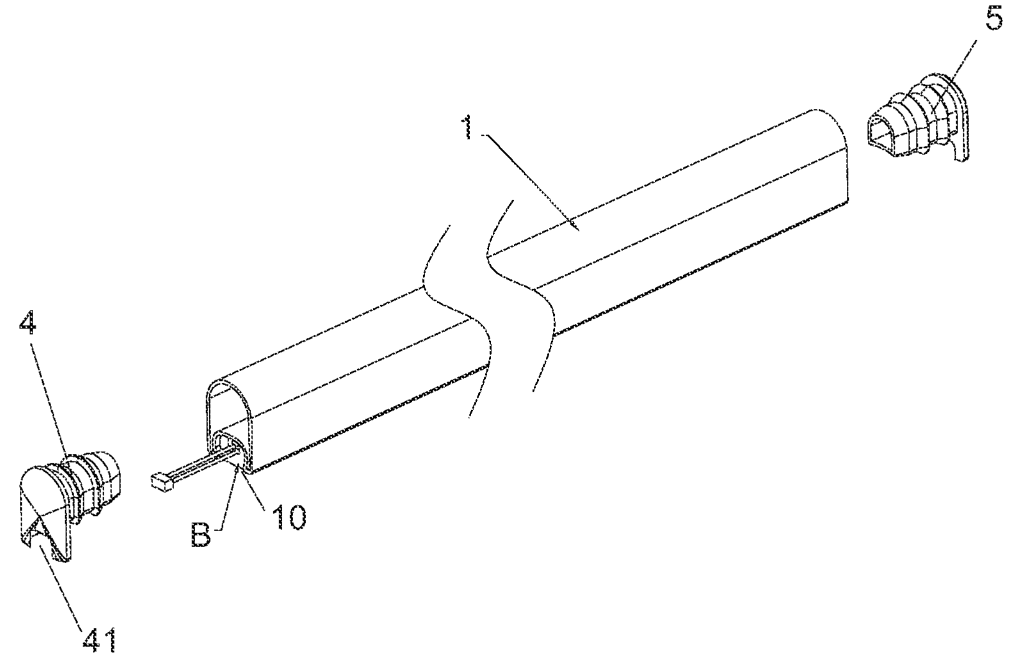
FIG. 1 is an exploded perspective view of a rod assembly for an umbrella according to Embodiment 1 of the present invention.
Figure 2:
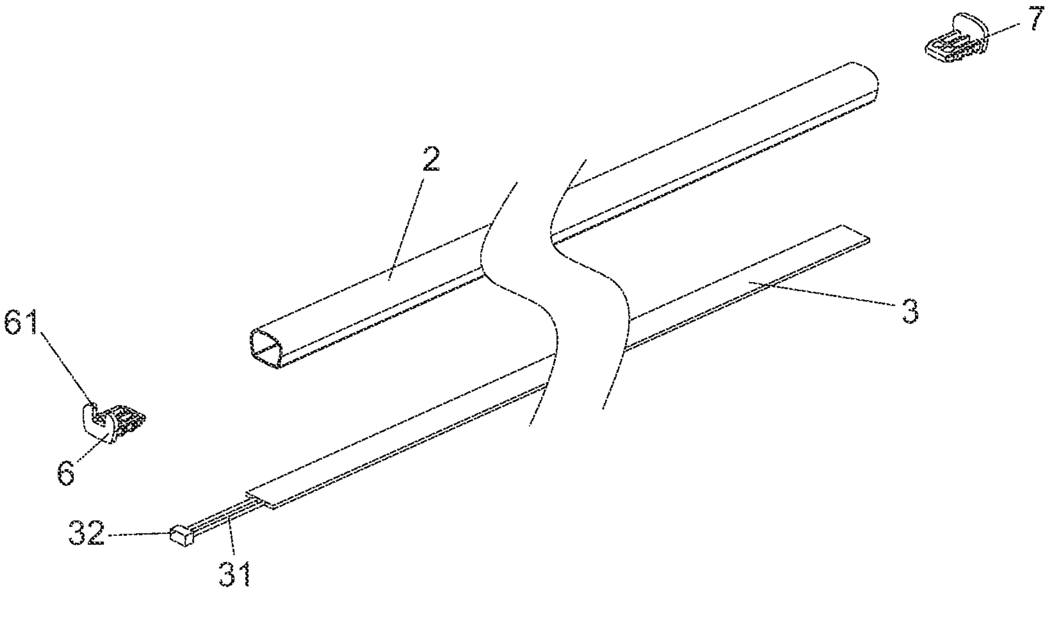
FIG. 2 is an exploded perspective view of a lampshade assembly according to Embodiment 1 of the present invention.
Figure 3:
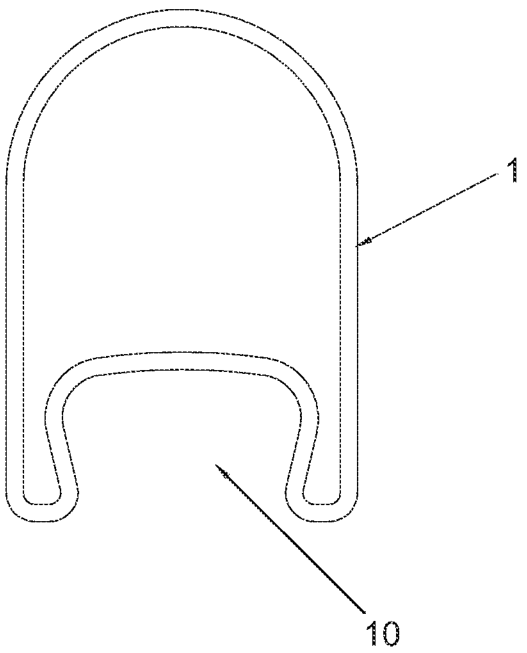
FIG. 3 is a front view of a rod according to Embodiment 1 of the present invention.
Figure 4:
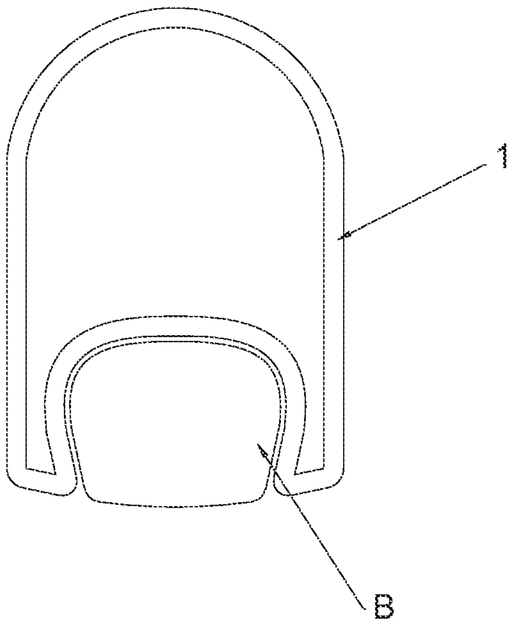
FIG. 4 is a front view of the rod assembly according to Embodiment 1 of the present invention.
Figure 5:
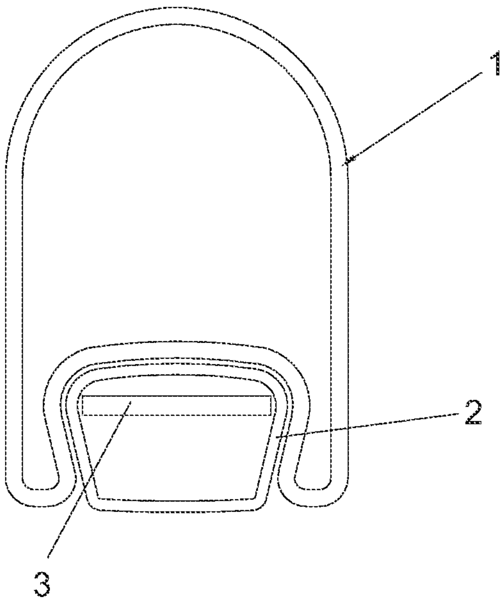
FIG. 5 is a sectional view of a rod assembly for an umbrella according to Embodiment 1 of the present invention.

The present invention will be further described below in detail by embodiments with reference to the accompanying drawings.

Embodiment 1

FIGS. 1-5 show a first preferred embodiment of the rod assembly for an umbrella of the present invention. The rod assembly comprises a rod 1 having a front end, a rear end and a bottom surface; and a lampshade assembly B; wherein, the lampshade assembly B comprises a lampshade 2 having a front end, a rear end, a top and a bottom and a light strip 3 having a left side, a right side, a front end and a rear end; the rod 1 is a hollow tube with a recess 10 extending lengthwise along the rod 1 on the bottom surface of the rod 1 for receiving and positioning the lampshade 2, the light strip 3 is arranged inside the lampshade 2. The bottom surface of the lampshade 2 is basically flush with a bottom surface of the rod 1. For example, the installation error of a distance between the two bottom surfaces is not greater than 5 mm. The recess 10 is formed by integrally inwardly extruding the rod 1 which is a hollow metal tube, or formed by bending the rod 1 which is a metal plate; a longitudinal section of the recess 10 is of a dovetail shape, the recess 10 has an opening at the bottom surface of the rod 1, a width of the opening is less than a maximum width of the whole recess 10; a width of the top of the lampshade 2 is wider than that of the bottom of the lampshade 2 matching with the recess 10 in size; the light strip 3 is arranged inside the lampshade 2 extending lengthwise along the lampshade 2, the light strip 3 has a wire 31 and a connector 32 both connected to the front end of the light strip 3.

The lampshade 2 matches the light strip 3 in length, the lampshade 2 has a front lampshade tube plug 6 at the front end of the lampshade 2, and a rear lampshade tube plug 7 at the rear end of the lampshade 2, the front lampshade tube plug 6 has a slot 61 for allowing the wire 31 at the front end of the light strip 3 to pass through. The rod 1 matches the lampshade 2 in length, the rod 1 has a front tube plug 4 at the front end of the rod 1 and a rear tube plug 5 at the rear end of the rod 1, and, the front tube plug 4 has a through hole 41 corresponding to the slot 61 on the front lampshade tube plug 6.

During assembling, the light strip 3 is inserted into and positioned in the top of the lampshade 2, the wire 31 extends outside from the front end of the lampshade 2, a front lampshade tube plug 6 and a rear lampshade tube plug 7 are mounted at the front end and the rear end of the lampshade 2, respectively. The assembled lampshade assembly B is then inserted into the recess 10 below the bottom surface of the rod 1. Finally, a front tube plug 4 and a rear tube plug 5 are mounted at the front end and the rear end of the rod 1, respectively. Since the width of the opening is less than the maximum width of the whole recess 10, the lampshade assembly B can be firmly clamped in the recess 10 and will not fall off.

Embodiment 2

Figure 6:
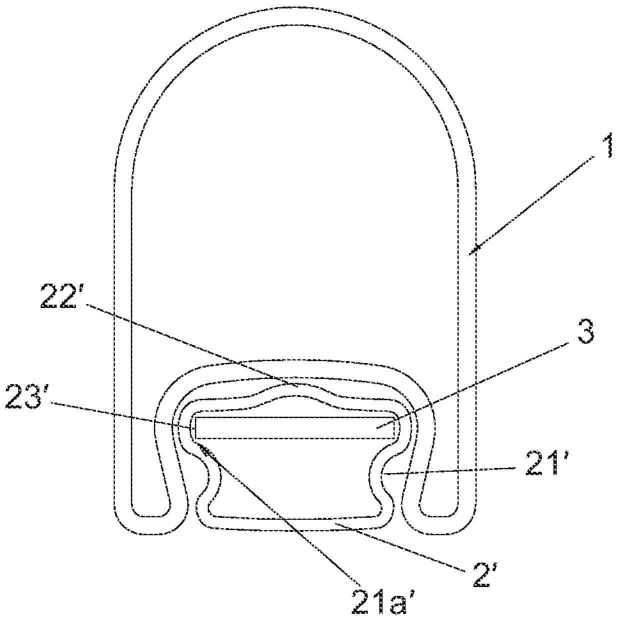
FIG. 6 is a sectional view of a rod assembly for an umbrella according to Embodiment 2 of the present invention.
Figure 7:
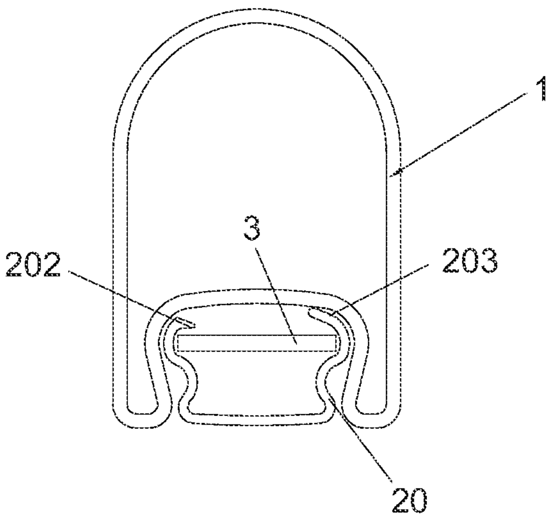
FIG. 7 is a sectional view of a rod assembly for an umbrella according to Embodiment 3 of the present invention.
Figure 8:
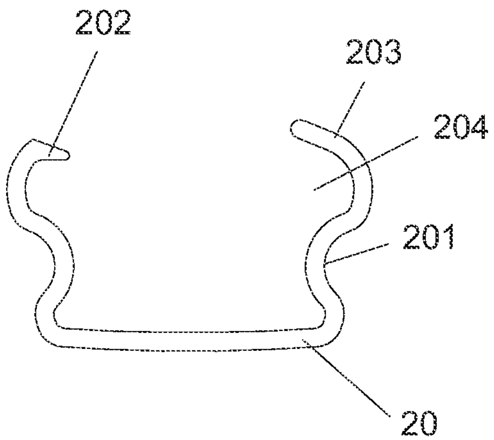
FIG. 8 is a sectional view of a lampshade according to Embodiment 3 of the present invention.
Figure 9:
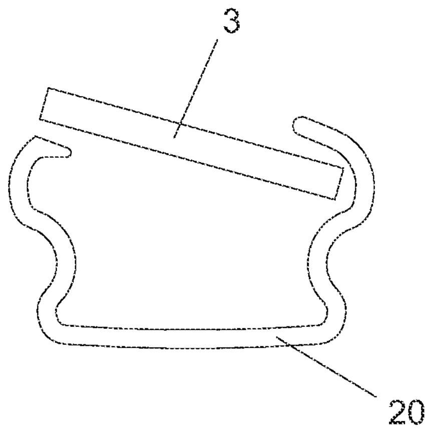
FIG. 9 is a perspective view of the lampshade and a light strip according to Embodiment 3 of the present invention when the light strip is clamped into the lampshade.
Figure 10:
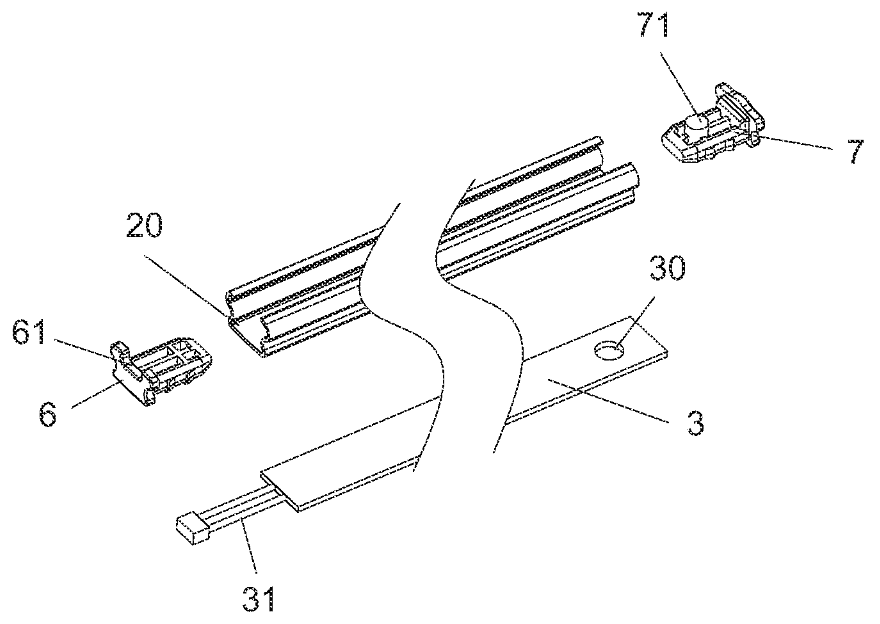
FIG. 10 is an exploded view of the rod assembly for an umbrella according to Embodiment 3 of the present invention.

FIG. 6 shows a second embodiment of the rod assembly for an umbrella of the present invention. The rod assembly in this embodiment differs from that in Embodiment 1 in that the shape of the lampshade 2 in this embodiment is further improved. In this embodiment, the lampshade 2' has two concave surfaces 21' respectively formed at a left side and a right side of the lampshade 2', a supporting edge **21*a*' is formed at an inner wall of each concave surface 21', a first positioning chamber 23' is defined between the top of the lampshade 2 and two supporting edges 21*a*' for receiving and positioning the light strip 3. The top of the lampshade 2 is sealed, and the lampshade 2 has a protruded portion 22' at a middle portion of the top of the lampshade 2, the protruded portion 22' with elasticity resists against a top surface of the recess 10**.

During assembling, the light strip 3 is inserted into and positioned in a first positioning chamber 23' at the top of the lampshade 2', the wire 31 extends outside from the front end of the lampshade 2', a front lampshade tube plug 6 and a rear lampshade tube plug 7 are mounted at the front end and the rear end of the lampshade 2', respectively. The assembled lampshade assembly B is then inserted into the recess 10 below the bottom surface of the rod 1. Finally, a front tube plug 4 and a rear tube plug 5 are mounted at the front end and the rear end of the rod 1, respectively. Since the width of the opening is less than the maximum width of the whole recess 10, the lampshade assembly B can be firmly clamped in the recess 10 and will not fall off.

Embodiment 3

FIGS. 7-10 show a third embodiment of the rod assembly for an umbrella of the present invention. The rod assembly for an umbrella in this embodiment differs from that in Embodiment 1 in that the shape of the lampshade 2 in this embodiment is further improved. In this embodiment, the lampshade 20 has two concave surfaces 201 respectively formed at a left side and a right side of the lampshade 20, a supporting edge **21*a*' is formed at an inner wall of each concave surface 201, a second positioning chamber 204 is defined between the top of the lampshade 20 and two supporting edges 21*a*' for receiving and positioning the light strip 3; the lampshade 20 has an opening with two sides at the top of the lampshade 20, the lampshade 20 has an inwardly-bended buckle 202 with a flat top at the top of the lampshade 20 corresponding to a first side of the opening, and the lampshade 20 has an inwardly-bended arc-shaped edge 203 at the top of the lampshade 20 corresponding to a second side of the opening, a top of the arc-shaped edge 203 resists against a top surface of the recess 10. the lampshade 20 has a front lampshade tube plug 6 at the front end of the lampshade 20, and a rear lampshade tube plug 7 at the rear end of the lampshade 20, a positioning boss 71 is arranged on the rear lampshade plug 7, the light strip 3 has a corresponding positioning hole 30 at the rear end of the light strip 3, the positioning boss 71 is inserted into the positioning hole 30 so that the rear end of the light strip 3 is sleeved on the positioning boss 71, and, the front lampshade tube plug 6 has a slot 61 for allowing the wire 31 at the front end of the light strip 3** to pass through.

During mounting, during mounting, the second side of the light strip 3 is firstly clamped into the arc-shaped edge 203 and the first side of the light strip 3 is then clamped and positioned in the second positioning chamber 204 by elasticity of the light strip 3. Thus, it is more convenient for the light strip 3 to be directly mounted in the lampshade 20. Similarly, a front lampshade tube plug 6 and a rear lampshade tube plug 7 are mounted at the front end and the rear end of the lampshade 20, respectively. Then, the lampshade assembly B is mounted in the recess 10 of the rod 1, and a front tube plug 4 and a rear tube plug 5 are mounted at the front end and the rear end of the rod 1, respectively, so that the lampshade 20 assembly is mounted on the rod 1.

Embodiment 4

Figure 11:
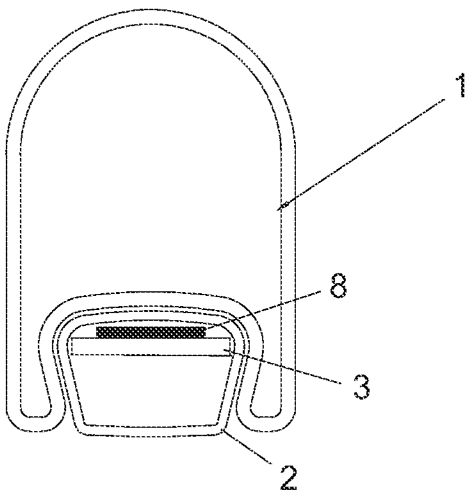
FIG. 11 is a sectional view of a rod assembly for an umbrella according to Embodiment 4 of the present invention.

FIG. 11 shows a fourth embodiment of the rod assembly for an umbrella of the present invention. The rod assembly for an umbrella in this embodiment differs from that in Embodiment 1 in that the light strip 3 in this embodiment has a magnet on a back side of the light strip 3, and the rod 1 is made of a magnetic adsorbing material, the lampshade assembly B is inserted into the recess 10 of the rod 1 and fixed by magnetic adsorption between the light strip 3 and the rod 1, so that the assembled rod assembly is firmer.

Embodiment 5

Figure 12:
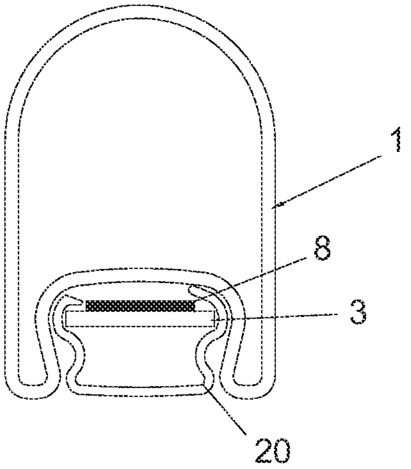
FIG. 12 is a sectional view of a rod assembly for an umbrella according to Embodiment 5 of the present invention.

FIG. 12 shows a fifth embodiment of the rod assembly for an umbrella of the present invention. The rod assembly for an umbrella in this embodiment differs from that in Embodiment 3 in that the light strip 3 in this embodiment has a magnet on a back side of the light strip 3, and the rod 1 is made of a magnetic adsorbing material, the lampshade assembly B is inserted into the recess 10 of the rod 1 and fixed by magnetic adsorption between the light strip 3 and the rod 1, so that the assembled rod assembly is firmer.

Embodiment 6

Figure 13:
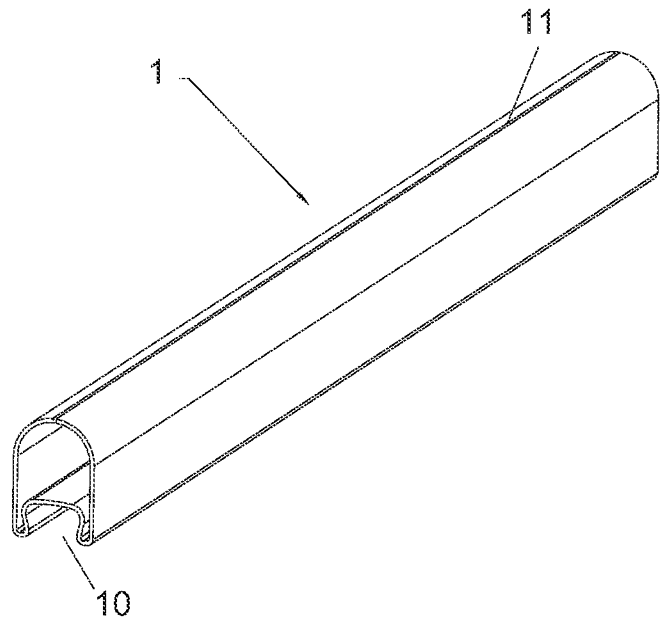
FIG. 13 is a perspective view of a rod according to Embodiment 6 of the present invention.
Figure 14:
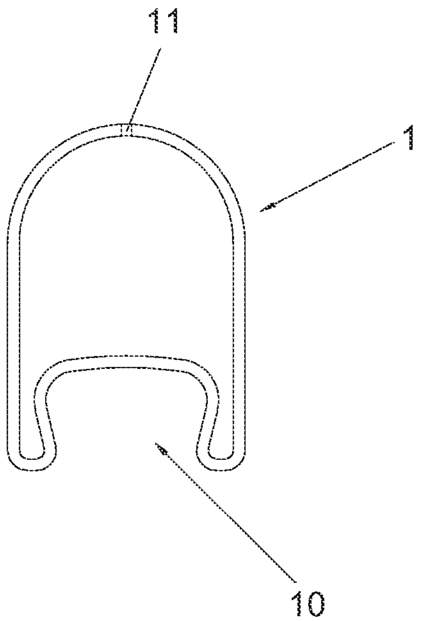
FIG. 14 is a front view of the rod according to Embodiment 6 of the present invention.

FIGS. 13-14 show a sixth embodiment of the rod assembly for an umbrella of the present invention. The rod assembly for an umbrella in this embodiment differs from that in Embodiment 1 in that the rod 1 is a hollow tube and is a one-piece part formed by bending and welding a plate, generally a metal plate, and the recess 10 for receiving and positioning the lampshade 2 is formed by bending the rod 1. A weld seam 11 may be arranged on the top of the rod 1. The remaining component is similar to Embodiment 1.

The rod 1 in the above embodiments may be a long rod or a short rod.

Figure 15:
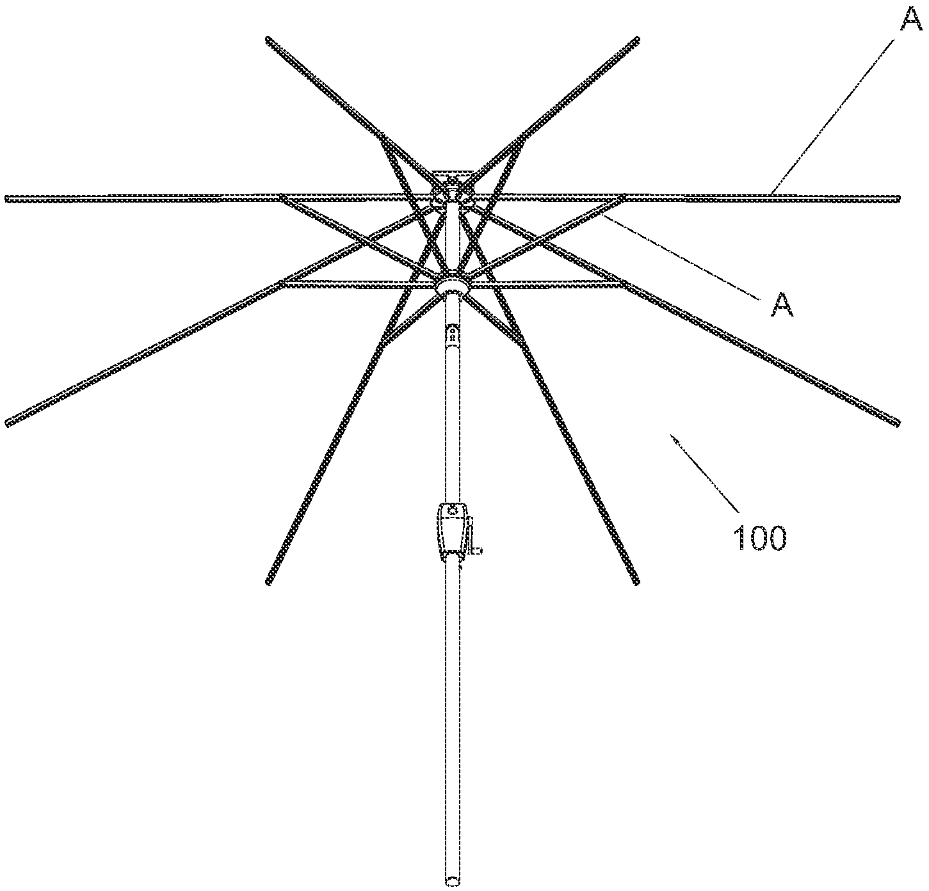
FIG. 15 is a bottom view of a center pole umbrella mounted with the rod assembly for an umbrella of the present invention.
Figure 16:
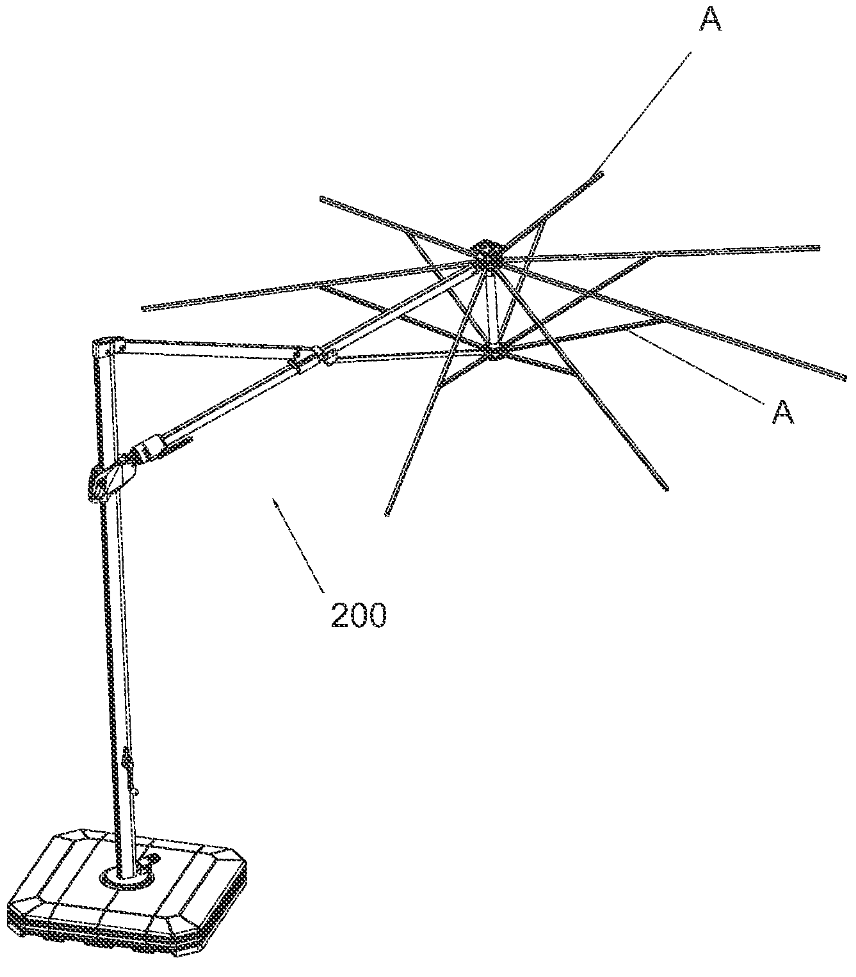
FIG. 16 is a perspective view of a cantilever umbrella mounted with the rod assembly for an umbrella of the present invention.
Figure 17:
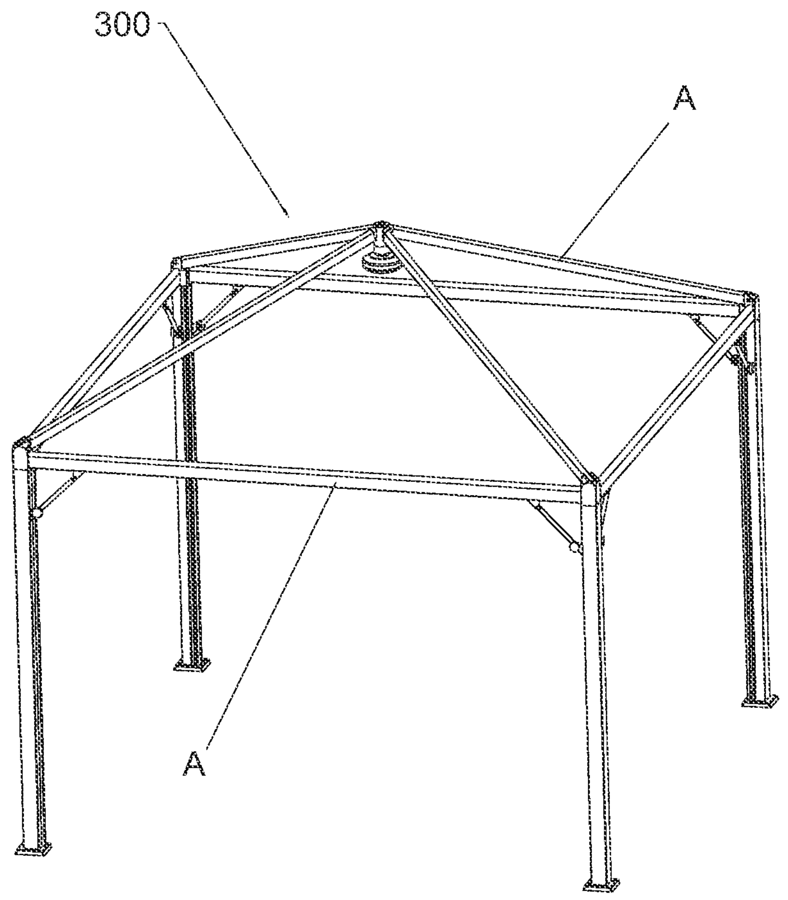
FIG. 17 is a perspective view of a light shed mounted with the rod assembly for an umbrella of the present invention when mounted.

The rod assembly for an umbrella A of the present invention may be mounted on a center pole umbrella 100 or a cantilever umbrella 200, as shown on FIGS. 15 and 16, or may be mounted on a light shed 300, as shown in FIG. 17.

When the light strip 3 needs to be repaired or replaced, the light strip 3 can be taken out by detaching the lampshade assembly B from the rod 1, so that it is convenient and quick to assemble and disassemble the rod assembly A.

The protection scope of the present invention is not limited to each embodiment described in this description. Any changes and replacements made on the basis of the scope of the present invention patent and of the description shall be included in the scope of the present invention patent.

The invention claimed is:

1. A rod assembly for an umbrella, comprising:

a rod having a front end, a rear end and a bottom surface; and a lampshade assembly;

wherein, the lampshade assembly comprises a lampshade having a front end, a rear end, a top and a bottom and a light strip having a left side, a right side, a front end and a rear end;

the rod is a hollow tube with a recess extending lengthwise along the rod on the bottom surface of the rod for receiving and positioning the lampshade, the lampshade is a hollow tube and the light strip is arranged inside the lampshade;

the rod and the lampshade are respectively an integral part formed integrally or a one-piece part formed by bending and welding a plate;

the recess is formed by integrally inwardly extruding the rod which is a hollow metal tube, or formed by bending the rod which is a metal plate;

a longitudinal section of the recess is of a dovetail shape, the recess has an opening at the bottom surface of the rod, a width of the opening is less than a maximum width of the whole recess;

a width of the top of the lampshade matches the recess in size, and is wider than a width of the bottom of the lampshade;

the light strip is arranged inside the lampshade extending lengthwise along the lampshade, the light strip has a wire and a connector both connected to the front end of the light strip; and the lampshade has two concave surfaces respectively formed at a left side and a right side of the lampshade, a supporting edge is formed at an inner wall of each concave surface, a first positioning chamber is defined between the top of the lampshade and two supporting edges for receiving and positioning the light strip.

2. The rod assembly of claim 1, wherein the top of the lampshade is sealed, and the lampshade has a protruded portion at a middle portion of the top of the lampshade, the protruded portion with elasticity resists against a top surface of the recess.

3. The rod assembly of claim 1, wherein the lampshade has an opening with two sides at the top of the lampshade, the lampshade has an inwardly-bended buckle with a flat top at the top of the lampshade corresponding to a first side of the opening, and the lampshade has an inwardly-bended arc-shaped edge at the top of the lampshade corresponding to a second side of the opening, a second positioning chamber is defined between the top of the lampshade and two supporting edges for receiving and positioning the light strip;

during mounting, the second side of the light strip is firstly clamped into the arc-shaped edge and the first side of the light strip is then clamped and positioned in the second positioning chamber by elasticity of the light strip.

4. The rod assembly of claim 1, wherein the lampshade matches the light strip in length, the lampshade has a front lampshade tube plug at the front end of the lampshade, and a rear lampshade tube plug at the rear end of the lampshade, a positioning boss is arranged on the rear lampshade plug, the light strip has a corresponding positioning hole at the rear end of the light strip, the positioning boss is inserted into the positioning hole so that the rear end of the light strip is sleeved on the positioning boss, and, the front lampshade tube plug has a slot for allowing the wire at the front end of the light strip to pass through.

5. The rod assembly of claim 4, wherein the rod matches the lampshade in length, the rod has a front tube plug at the front end of the rod and a rear tube plug at the rear end of the rod, and, the front tube plug has a through hole corresponding to the slot on the front lampshade tube plug.

6. The rod assembly of claim 1, wherein the light strip has a magnet on a back side of the light strip, and the rod is made of a magnetic adsorbing material, the lampshade assembly is inserted into the recess of the rod and fixed by magnetic adsorption between the light strip and the rod.

* * * * *